United States Patent [19]

Holmes

[11] 4,418,721
[45] Dec. 6, 1983

[54] FLUIDIC VALVE AND PULSING DEVICE

[75] Inventor: Allen B. Holmes, Rockville, Md.

[73] Assignee: The United States of America as represented by the Secretary of the Army, Washington, D.C.

[21] Appl. No.: 273,170

[22] Filed: Jun. 12, 1981

[51] Int. Cl.³ .......................... E21B 47/12; G01V 1/40
[52] U.S. Cl. ..................................... 137/810; 137/813; 137/830; 137/831; 175/40
[58] Field of Search ............... 137/808, 809, 810, 812, 137/813, 830, 831, 833

[56] References Cited

U.S. PATENT DOCUMENTS

| | | | |
|---|---|---|---|
| 3,198,214 | 8/1965 | Lorenz | 137/813 |
| 3,331,382 | 7/1967 | Horton | 137/809 |
| 3,515,158 | 6/1970 | Utz | 137/812 |
| 3,638,671 | 2/1972 | Harvey et al. | 137/809 |
| 3,993,101 | 11/1976 | Tippetts et al. | 137/831 |
| 4,134,100 | 1/1979 | Funke | 137/836 |
| 4,276,943 | 7/1981 | Holmes | 137/810 |
| 4,291,395 | 9/1981 | Holmes | 137/813 |
| 4,323,991 | 4/1982 | Holmes et al. | 137/808 |

*Primary Examiner*—A. Michael Chambers
*Attorney, Agent, or Firm*—Robert P. Gibson; Anthony T. Lane; Saul Elbaum

[57] ABSTRACT

A high capacity fluidic valve is disclosed which is useful for creating pressure pulses in a drill string for communicating diagnostic information from the bottom of a well bore to the surface during drilling. The device of the present invention comprises essentially a vortex chamber having an element therein which is capable of rapidly changing the flow through the chamber from radial to vortical. Flow throttling action in the valve is produced by the vortical flow in the chamber, thereby producing pressure pulses in the fluid stream flowing through the valve.

13 Claims, 6 Drawing Figures

FLUIDIC VALVE AND PULSING DEVICE

RIGHTS OF THE GOVERNMENT

The invention described herein may be manufactured, used and liscensed by or for the United States Government for governmental purposes without the payment to me of any royalty thereon.

CROSS REFERENCES TO RELATED APPLICATIONS

The following co-pending applications disclose devices which are suitable or intended for use in mud pulsing systems: U.S. Pat. No. 4,291,395 to Holmes, issued Sept. 22, 1981; U.S. Pat. No. 4,323,941 to Holmes et al, issued Apr. 6, 1982; U.S. Pat. No. 4,276,943 to Holmes, issued July 7, 1981; Ser. No. 93,084 filed Nov. 9, 1979; and U.S. Pat. No. 4,391,294 to Holmes, issued July 5, 1983.

BACKGROUND OF THE INVENTION

The usefulness of obtaining current real time information from the bottom of a well during drilling is well known within the drilling industry. Data of this type can significantly increase drilling safety, increase drilling efficiency up to 15% and provide accurate real time determinations of hole direction.

Despite the fact that mud pulse telemetry was originally conceived for all of these purposes, the present high cost of providing the service (estimated at $2,500 to $4,500 per day) has limited its usefulness to transmitting hole direction measurements only. One of the most significant factors keeping operating costs high is the general unavailability of high speed, reliable, inexpensive pulser valves. Prior art valves produced pulse rates on the order of one pulse every few seconds, therefore severely limiting the amount of data that can be transmitted at any given time and increasing the cost per data point. Several of the above noted co-pending applications disclose fluidic pulsing devices which are capable of much more rapid transmission of information. Those devices, along with the apparatus disclosed in the present application, represent a significant advancement in the art of mud pulse telemetry.

Another problem with existing systems is the high cost of equipment, estimated to be in the hundreds of thousands of dollars range per system. Still another problem is the relatively great amount of electrical power that is consumed in the bore hole by presently known systems, necessitating the use of auxiliary turbine generators to supply the power.

The art of mud pulse telemetry is in need of a fast acting valve which will permit the reliable transmission of reasonable quantities of data in a short period of time. It is highly desireable that such a valve be an inexpensive device as it may sometimes be left abandoned at the bottom of a well when a break occurs in the drill string. Any such valve must operate efficiently to eliminate the additional costs required for supplying significant amounts of auxiliary power.

It is therefore an object of this invention to provide a mud pulse transmitter having a high pulse rate capability.

It is another object of this invention to provide a mud pulse transmitter which is inexpensive to fabricate and to maintain.

It is another object of this invention to provide a mud pulser which is highly reliable in extended periods of operation.

It is still another object of this invention to provide a pulse transmitter which is readily adaptable for use with standard drilling hardware.

Yet another object of this invention is to provide a pulser which requires minimal electrical or other power to operate.

SUMMARY OF THE INVENTION

The device of the present invention utilizes an inlet for supply flow, a vortex chamber, a flow diffuser in the chamber for preventing the natural development of a vortex in the chamber, and a tab for selectively triggering the development of a vortex. Means are provided for injecting the tab into the supply flow. The development of a vortex in the chamber restricts the passage of flow through the chamber.

The invention relates to a valve capable of producing pulse rates between 10 and 50 pulses per second at flow circulation rates in the 500 gallon per minute range. The invention utilizes very little electrical energy as most of its operating power is derived from the flow of fluid itself. The presently disclosed valve employs the action of a vortex flow in much the same way that a conventional valve utilizes a poppet and seat. The response time of the present invention is determined by the length of time it takes fluid to pass through the valve rather than the time required to move a heavily pressure loaded valve stem and poppet. The device of the present invention contains no mechanical parts other than those used for actuation, and is so simple and inexpensive to fabricate that its potential use as a throw-away device may prove economically feasible.

DESCRIPTION OF THE PREFERRED EMBODIMENTS

Figure 1:
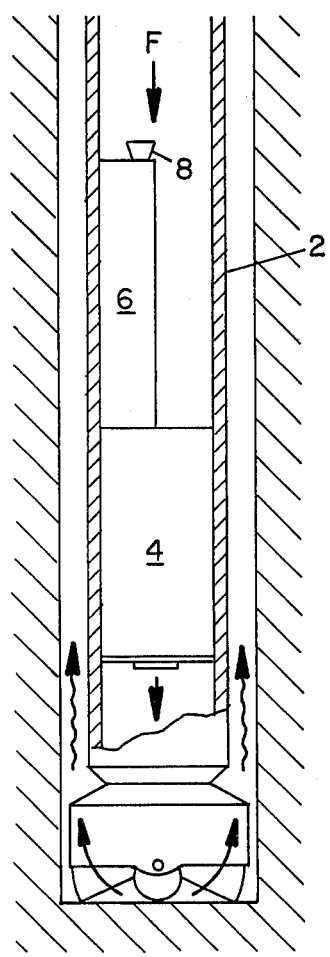
FIG. 1 illustrates the general arrangement of the device of the present invention used in conjunction with a standard drill string.

FIG. 1 illustrates a conventional drill string 2 in a bore hole. Reference numeral 4 designates an instrumentation package which comprises transducers capable of measuring pressure, temperature, drill orientation, etc. The instrumentation package comprises means responsive to the transducers to relay control signals to the pulsing device, generally designated by the reference numeral 6. Drilling fluid, commonly called mud, flows through the drill string as designated by the arrow F. Inlet 8 is provided to allow at least a portion of the flow to enter the pulsing device. Flow passing through the pulser, as well as the flow which by-passes the pulser, exits the drill string in the region of the drill bit and returns to the surface of the bore hole on the exterior of the drill string, as illustrated by the series of arrows in FIG. 1.

Pulses generated by the device 6, in response to signals from the instrumentation package 4, travel through the fluid flowing in the drill string. These pulses are detected by appropriate sensing and recording means at the earth's surface, as is well known in the art of mud pulse telemetry. The fluid mud is used primarily to carry cuttings to the surface and to prevent the hole from cracking or collapsing, as is also well known in the art.

Figure 2:
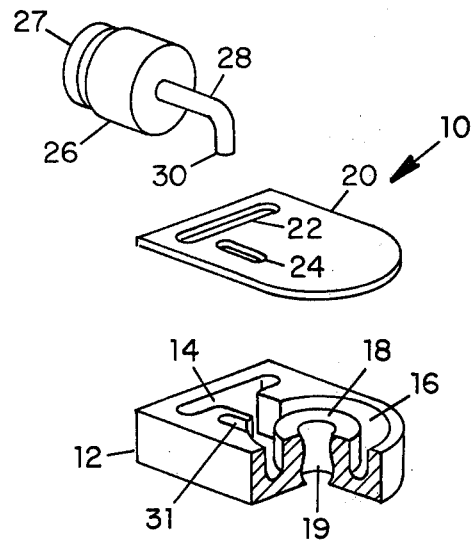
FIG. 2 is an exploded view of a valve or pulser of the present invention.

FIG. 2 represents an exploded view of a flow control valve which comprises the pulsing device of the present invention, generally designated by reference numeral 10. The valve body 12 comprises an inlet portion 14 for permitting flow of fluid mud to enter the valve. The vortex chamber 16 comprises a diffuser 18 in the center thereof, surrounding centrally located outlet 19. The diffuser and the periphery of the vortex chamber 16 form an annular flow space. The height of the diffuser 18 is less than the interior weight of the vortex chamber, allowing fluid in the chamber to flow over the top of diffuser 18 and through the outlet 19.

A cover plate 20 is provided for the valve, and may be securely attached to the body portion 12 in any suitable manner effecting a fluid tight seal. Opening 22 in the cover permits flow to enter through inlet 14. Opening 24 in the cover is aligned with notch 31 in the valve portion 12, and allows the control tab 30 to be inserted into the valve.

Solenoid 26 comprises the actuating means for the flow control device of the present invention. Solenoids are standard and commonly available items, and will not be described in great detail herein. The moveable plunger portion 28 of the solenoid comprises a laterally extended tab portion 30 which, as noted above, extends through opening 24 into notch 31 of the valve. Stop means 27 is employed to positively limit the range of travel of the plunger means 28.

Figure 3A:
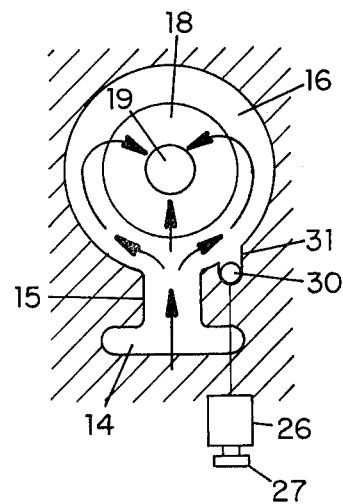
FIGS. 3A and 3B are sectional views of the valve of the present invention, illustrating the mode of operation of the device.
Figure 3B:
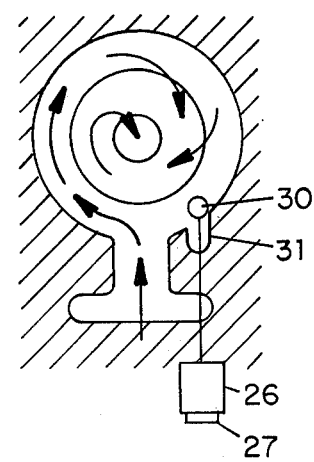

The operation of the present apparatus will be described with reference to FIGS. 3A and 3B. As illustrated by the arrows in FIG. 3A, fluid flow enters the valve of the present invention through inlet 14. The flow passes radially into the valve through nozzle 15. The radial flow contacts the diffuser 18 and is distributed through the vortex chamber in a relatively symmetrical fashion, resulting in a radially directed flow over the diffuser 18 toward the outlet 19, as illustrated in FIG. 3A. At this time, control tab 30 is maintained within the notch 31 and does not interfere with the flow pattern established in the valve.

If a control signal is applied to the solenoid 26, the plunger 28 will move in response thereto, thus causing tab 30 to move out of the notch 31 and into the vortex chamber itself. Stop means 27 positively controls the degree of movement of the plunger and tab, thus assuring that the tab will be properly positioned within the chamber. The presence of tab 30 in the vortex chamber disturbs the symmetrical flow previously described, and causes the flow to assume a vortical motion within the chamber. The action of the vortex increases the tangential velocity of the flow thereby reducing the static pressure which would normally drive the fluid through the outlet 19. The reduction of flow rate which occurs as a result of this action is equated to a reduction in flow area. This produces a rapid reduction in flow rate which results in a pressure pulse being generated in the fluid stream entering and passing through the vortex valve. If the tab 30 is again withdrawn into the notch 31, the flow pattern will return to that shown in FIG. 3A, the effective area of the valve will return to its original level as well as the rate of flow through the valve.

Each time the tab 30 is injected into the vortex chamber, the vortical flow is generated, thus producing a pressure pulse in the flow passing through the chamber. It is not necessary to open and close conventional type poppet valves nor effect any other complex or difficult mechanical movements. The movement of the tab 30 can be easily and very rapidly controlled yet requires a minimal amount of power. Consequently, while consuming very little energy, the valve means of the present invention is capable of generating pulses in the fluid flow at an extremely rapid rate as compared to prior art devices.

It is to be understood that, although a moveable tab is described, actuation could be accomplished by a hydraulically actuated tab or by injection of a control fluid stream on one or both sides of the inlet nozzle 15.

Figure 4:
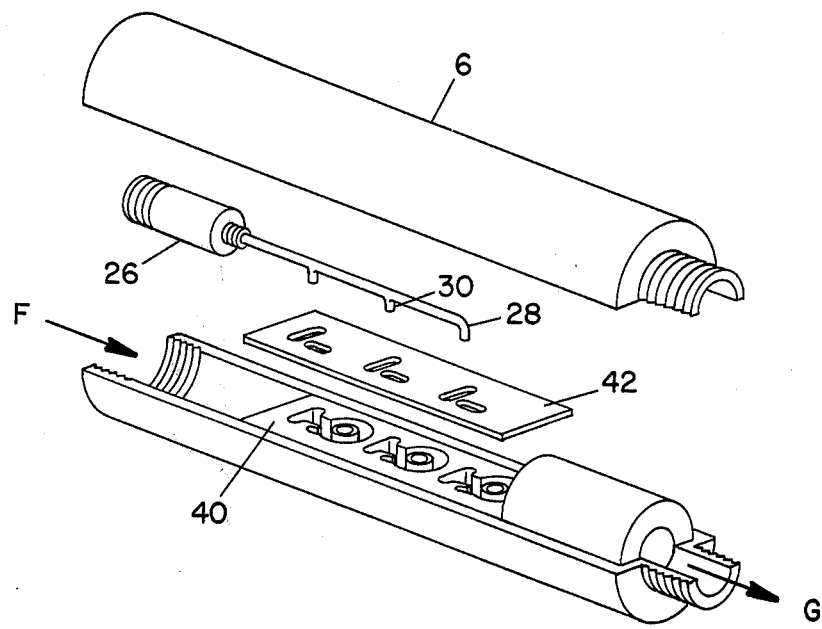
FIG. 4 illustrates an embodiment of the present invention which comprises several valves or chambers operating in parallel.

It is to be understood that several such valves can operate in parallel and can be located along the axis of the drill string, as shown in FIG. 4. The embodiment of FIG. 4 comprises a casing designated by reference numeral 6. The casing encloses valve body 40 which comprises several vortex chambers, each receiving a portion of the flow entering the casing. Three vortex chambers are shown in FIG. 4, but it is to be understood that any suitable number may be utilized. Cover plate 42 corresponds in function to cover plate 20 of FIG. 2, and comprises the appropriate openings 22 and 24 for each of the respective vortex chambers. Solenoid 26, having plunger 28 is provided as a common control means for the several vortex chambers. Plunger 28 comprises several distinct control tabs 30 for the respective vortex chambers. Fluid flow enters the casing 6, as indicated by arrow F, a portion of the flow entering each of the respective vortex valves. The flow passing through the valves exits the pulsing device as illustrated by arrow G.

To those skilled in the art of fluid control it will be apparent that a valving circuit configuration of this type provides added advantages over the use of a single valve. A multi-stage valve configuration permits the use of smaller valves to reduce the response time of each respective valve. Such a device also permits the use of optimum flow geometries as determined by chamber diameter and height ratios. Staging permits a virtually unlimited choice of effective total flow area to minimize operational pressure drop. It also makes efficient use of unlimited space along the axis of a drill string rather than being confined to the limited space across the diameter of the pipe. Proper arrangement of the respective valve stages, as shown in FIG. 4 allows for the use of a single actuation device for all such stages.

Figure 5:
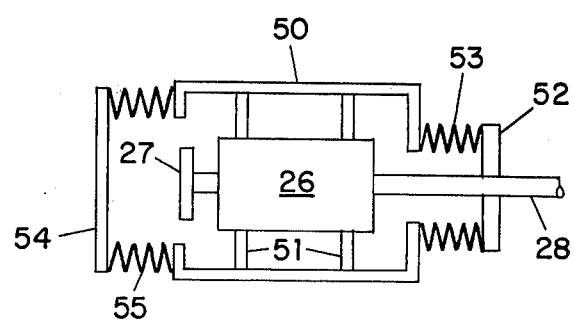
FIG. 5 illustrates in greater detail a preferred embodiment of the actuator of the present invention.

FIG. 5 illustrates a preferred embodiment of the solenoid actuator of the present invention. As the actuator is called upon to operate in a rather adverse environment, it is advisable, if not necessary, to adequately protect the solenoid device. Solenoid 26 may be mounted within a metallic casing 50, by means of any suitable support device illustrated schematically at 51. Reference numeral 52 denotes a disc or collar fixedly attached to the plunger 28. Metallic compliant bellows 53 extends between the casing 50 and the collar 52. Additional bellows 55, also formed of a compliant metallic material, extends between the casing 50 and a metallic end cap 54. The interior of the case 50 is filled with oil.

The motion of the plunger 28 is transmitted through the compliant metallic bellows 53 while the second bellows 55 is permitted unconstrained movement. The unconstrained movement of the second bellows equalizes the normally high well bore hydrostatic pressure on the outside of the container (1,000 to to 10,000 psi) and the pressure of the oil confined to the container. The second bellows also provides compensation for expansion and/or compression of the oil due to thermal effects of the environment within the bore hole as well as the thermal effects of operation of the solenoid. It should be noted that the above described container can be a totally welded enclosure, thereby eliminating the need for seals of any kind.

The mud pulser valve of the present invention is an advantageous improvement over any previously known fluidic mud pulser valve due to the elimination of the need for a fluid amplifier upstream of the vortex chamber. The mud pulser of the present invention provides enhanced pressure recovery because the normal pressure loss in an amplifier is eliminated. The response rate of the present invention is significantly increased due to the reduction in flow travel distance between the inlet and outlet of the present valve as compared to the distance between the inlet and outlet of a valve and amplifier combined. Fabrication costs are substantially reduced due to the elimination of the complex flow geometry of the amplifier. The valve of the present invention will be less susceptible to clogging by cuttings, chips, rocks, etc. because of the virtually unobstructed path through the present device.

While the invention has been described with reference to the accompanying drawings, I do not desire to be limited to the details disclosed therein as obvious modifications may be made by one of ordinary skill in the art.

What I claim is:

1. Means for controlling the flow of a fluid comprising essentially,
   a vortex chamber having a radial inlet thereto for said flow, and a centrally located outlet from said chamber, whereby flow into said chamber flows radially to said outlet, and
   a movable barrier within said vortex chamber for selectively altering said flow from radial to vortical within said chamber;
   wherein said movable barrier comprises a tab within said vortex chamber, said vortex chamber comprising a recess in a peripheral wall thereof, and said tab is movable between a first position located within said recess and a second position in said chamber exterior of said recess.

2. Means as in claim 1 wherein
   said barrier tab in said first position is substantially out of contact with said radial flow in said chamber, and
   said barrier tab in said second position contacts said radial flow, thereby altering said radial flow to vortical flow within said chamber.

3. Means as in claim 2 in combination with a drill string having fluid flowing therethrough, said vortex chamber receiving flow of fluid from said drill string, said change in fluid flow from radial to vortical within said chamber producing a variation in flow rate and a pressure pulse in the fluid in the drill string.

4. Means as in claim 1, wherein said vortex chamber further comprises a diffuser surrounding said centrally located outlet, and an annular flow path between said diffuser and a peripheral portion of said chamber, and said second position of said tab is located in said annular flow path.

5. Means, as in claim 4, wherein said peripheral wall of said vortex chamber defining said recess also constitutes said peripheral portion of said chamber which defines, together with said diffuser, said annular flow path therebetween.

6. Means as in claim 5, wherein said peripheral wall of said vortex chamber defining said recess also constitutes said peripheral portion of said chamber which defines, together with said diffuser, said annular flow path therebetween.

7. Means for producing pulses in a flowing fluid, comprising
   a vortex chamber having a radially disposed inlet thereto for receiving at least a portion of said flowing fluid, a centrally disposed outlet whereby flow into said chamber flows radially to said outlet, and a recess in a peripheral wall of the vortex chamber; and
   a movable barrier within said vortex chamber for selectively altering the flow within said chamber from radial to vortical flow, whereby flow to said outlet is impeded and a consequential change in flow rate generates a pressure pulse in said fluid, said barrier being movable between a first position located within said recess and a second position in said chamber exterior of said recess.

8. Means as in claim 7 further comprising actuating means for moving said barrier.

9. Means as in claim 8 wherein said actuating means is located external of said chamber.

10. Means as in claim 9 wherein said actuating means comprises an electrically operated solenoid operatively connected to said barrier to effect movement of said barrier upon operation of said solenoid.

11. Means as in claim 9 comprising at least two of said vortex chambers each having a respective movable barrier therein, said at least two chambers operating in parallel fashion and each receiving at least a portion of said flowing fluid, and common actuating means operatively connected to each of said respective movable barriers whereby all of said barriers can be actuated simultaneously.

12. Means as in claim 11 in combination with a drill string, said drill string having fluid flowing therethrough, said means for producing pulses generating pulses in said fluid in the drill string.

13. Means as in claim 7, wherein said vortex chamber further comprises a diffuser surrounding said centrally located outlet, and an annular flow path between said diffuser and a peripheral portion of said chamber, and said second position of said movable barrier is located in said annular flow path.

* * * * *